Patented Apr. 8, 1941

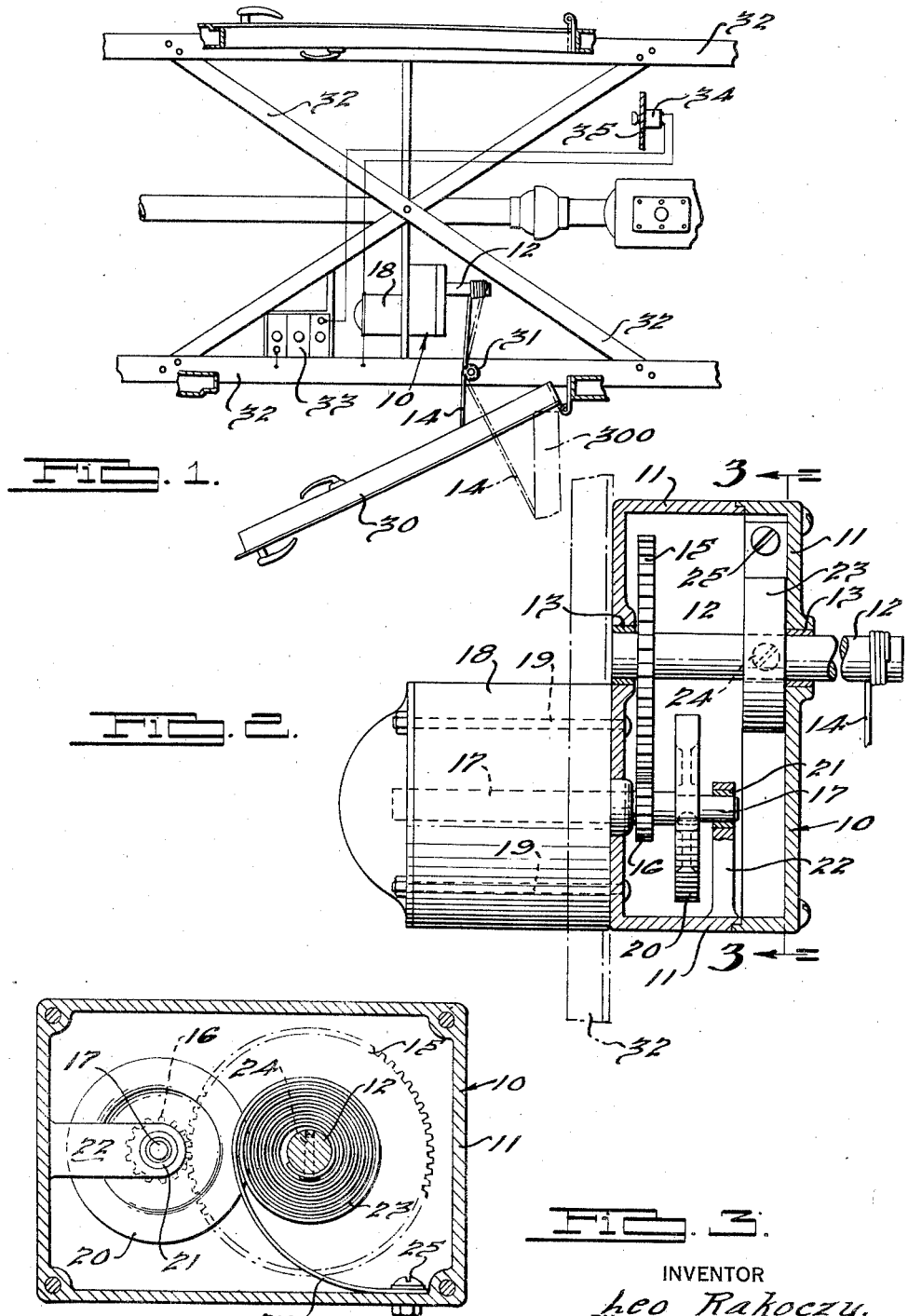

2,237,576

UNITED STATES PATENT OFFICE 2,237,576

DOOR CLOSER

Leo Rakoczy, Detroit, Mich.

Application October 7, 1940, Serial No. 359,996

2 Claims. (Cl. 16—49)

This invention relates to door closers particularly adapted for closing automobile doors from the driver's seat.

The recent widening of the front seat of motor vehicles has made it impossible for the driver to reach the right-hand door for closing when seated in driving position at the steering wheel of the vehicle. It is necessary for a driver to slide from the driver's position laterally across the front seat of the modern wide motor vehicle to reach the right-hand door to close the same.

The electrical system generally employed in motor vehicles will not admit of employing apparatus for closing one or more doors thereof which consumes large quantities of electric current, therefore, prior to the instant invention, it has been considered impractical to use electric door closers for closing one or more doors of motor vehicles.

With the foregoing in view, the primary object of the invention is to provide an economical to manufacture, readily installed electrically operated door closer means for automotive vehicles.

Another object of the invention is to provide a door closer for automotive vehicle doors requiring an extremely small motor to accomplish the relatively heavy operation of closing a motor vehicle door.

Another object of the invention is to provide an electrically operated door closer for automotive vehicle doors including mechanical booster means for reducing the size and current consumption of the electro-motive means employed.

Another object of the invention is to provide an electrically operated door closer for automotive vehicle doors including mechanical means energized by the manual opening of the door to be closed by the door closer whereby to reduce to a minimum the size and current consumption of the electro-motive means employed.

Other objects of the invention will become apparent by reference to the following detailed description taken in connection with the accompanying drawing, in which:

Fig. 1 is a more or less diagrammatic view of a door closer embodying the invention mounted in operating position on a motor vehicle for closing the right-hand front door thereof.

Fig. 2 is a horizontal sectional view of a door closer unit embodying the invention.

Fig. 3 is a vertical sectional view taken on the line 3—3 of Fig. 2.

Although the invention is disclosed and described herein as applied to closing a right-hand automotive vehicle door, it is obvious that the door closer may be applied to other vehicle doors with equal facility.

Referring now to the drawing wherein like numerals refer to like and corresponding parts throughout the several views, the door closer unit generally designated by the numeral 10 comprises a housing 11 into which is rotatably mounted a winding shaft 12 on suitable bearings 13. The said winding shaft 12 extends through the housing 11 and serves as a drum upon which a flexible door closing cable 14 is anchored and wound. The winding shaft 12 has a gear 15 keyed thereon which is in constant mesh with a pinion 16 keyed on the rotor shaft 17 of an electric motor 18. The said electric motor 18 is secured onto the outside of the housing 11 by suitable bolts 19 and has its rotor shaft 17 extending into the housing 11. A fly wheel 20 is keyed onto the extended rotor shaft 17 which is preferably rotatably supported at its extreme end in a suitable bearing 21 fixed into a bracket 22 preferably cast integral with one side of the housing 11.

A coiled tape or clock spring 23 is secured at one end to the winding shaft 12 by the stud 24, is coiled therearound, and is secured at its other end to the housing 11 by means of a bolt 25. The door closing cable 14 is wound around the winding shaft 12 so that it is under slight tension when the door 30 to be closed by a door closer embodying the invention is in its closed position. The length of the coiled tape or clock spring 23 is sufficient to permit substantially all of the door closing cable 14 to be payed out from the winding shaft 12 when the door is fully opened; the said tape or clock spring 23 being tightly coiled and the door closing cable being under maximum tension therefrom when the door 30 to be closed by the door closer is in its fully open position as indicated by the numeral 300 in Fig. 1. A guide wheel or pulley 31 may be mounted in a suitable location on the frame 32 of the automotive vehicle to control the location of the door closer cable 14 and to direct the winding thereof onto the winding shaft 12.

The motor 18 of the door closer 10 is preferably connected to the battery 33 of a motor vehicle equipped with a door closer 10 as indicated diagrammatically in Fig. 1, one terminal of the motor 18 and battery 33 being grounded and the other terminal of the motor 18 being connected to the ungrounded terminal of the battery 33 through a suitable push button switch 34 mounted in a convenient position on the dash or instrument panel 35 of the motor vehicle.

When the motor vehicle door 30 is opened, the flexible door closing cable 14 of the door closer 10 is unwound from the winding shaft 12 and the tape or clock spring 23 is tensioned. The strength of the said tape or clock spring 23 is preferably just below that which is required to overcome the inertia of the door 30 when opened, however, when the push button switch 34 is closed, the motor 18 is energized by electric current from the battery 33 and overcomes the inertia of the open door 30, and both the motor 18 and the clock spring 23 act in unison to wind the door closing cable 14 on the winding shaft 12 which swings the door 30 closed. The fly wheel 20 mounted on the rotor shaft 17 of the motor 18 develops sufficient inertia to aid the motor 18 to close the door 30 when the booster effect of the clock spring 23 becomes substantially nil at and near the completion of the closing of the said door 30.

The foregoing provides a simple, economical and practical means for accomplishing the relatively heavy task of closing a motor vehicle door by electrical means within the limits of the usual low voltage automotive vehicle electric system with a relatively small motor and with a minimum consumption of current.

Although but one embodiment of the invention has been disclosed and described in detail, it is obvious that many changes may be made in the size, shape, arrangement and detail of the various parts thereof without departing from the spirit of the invention as defined by the appended claims.

I claim:

1. A power unit for closing automotive vehicle doors comprising a winding shaft serving as a drum for winding a cable connected to a vehicle door, a relatively high speed motor having less than sufficient power to close a vehicle door geared to said slow speed shaft, booster spring means on said winding shaft normally unwound when said door is closed and wound when said door is opened capable of supplying the deficiency in power of said motor for closing said door when said motor is energized, and a flywheel on said motor for maintaining the inertia thereof when and as the effect of the power booster means becomes decreased as the said door approaches its closed position.

2. An electrically operated door closer for automotive vehicle doors comprising an electric motor of less than sufficient power to close a vehicle door having an extended rotor shaft, a flywheel on the said extended rotor shaft, a relatively low speed cable winding shaft geared to the said rotor shaft, a flexible cable connected to said door anchored to said cable winding shaft and wound therearound when said door is closed, a clock type spring disposed around the said winding shaft anchored at its inner end thereto and anchored at its outer end at a point fixed with respect to said shaft, the said clock type spring being substantially unwound when said door is closed and wound by the rotation of said winding shaft when said door is opened, the said clock type spring serving as power booster means for aiding the said motor to close said door, and the said flywheel maintaining the inertia of the rotor of the said motor when and as the effect of the said power booster means becomes decreased as the said door approaches its closed position.

LEO RAKOCZY.